United States Patent [19]

Holm

[11] 4,430,891

[45] Feb. 14, 1984

[54] METHOD AND APPARATUS FOR MEASURING VOLUME

[76] Inventor: Albert E. Holm, 7259 First St., Marine City, Mich. 48039

[21] Appl. No.: 332,885

[22] Filed: Dec. 21, 1981

[51] Int. Cl.$^3$ ............................................. G01F 17/00
[52] U.S. Cl. ........................................ 73/149; 73/37
[58] Field of Search ...................... 73/37, 40, 49.2, 149

[56] References Cited

U.S. PATENT DOCUMENTS

| | | | |
|---|---|---|---|
| 2,270,505 | 1/1942 | Burleson | 73/149 |
| 2,341,138 | 2/1944 | Davis | 73/149 |
| 2,635,466 | 4/1953 | Roberts | 73/149 |
| 2,666,326 | 1/1954 | Poole et al. | 73/149 |
| 3,060,735 | 10/1962 | Baker | 73/149 |
| 3,113,448 | 12/1963 | Hardway et al. | 73/149 |
| 3,221,539 | 12/1965 | Evans et al. | 73/49.2 |
| 4,047,423 | 9/1977 | Eason | 73/40 |
| 4,154,098 | 5/1979 | Pelletier | 73/149 |

FOREIGN PATENT DOCUMENTS 393595 12/1973 U.S.S.R. ............................ 73/149

*Primary Examiner*—S. Clement Swisher
*Attorney, Agent, or Firm*—Burton, Parker & Schramm

[57] ABSTRACT

A method and apparatus for measuring the volume of a chamber in a part, such as the combustion chamber of an internal combustion engine cylinder head by, comparing the test chamber with a reference chamber of known volume, wherein the reference chamber is exposed to the part containing the test chamber so that ambient variables are minimized, and accurately controlled quantities of a gas are injected into each chamber and the difference in pressures in the chambers read as a function of test chamber volume, and thereafter the rate of change of pressure differences in the chambers is read as a function of chamber leakage and the volume measurement discarded if the rate of change exceeds a determined value.

25 Claims, 5 Drawing Figures

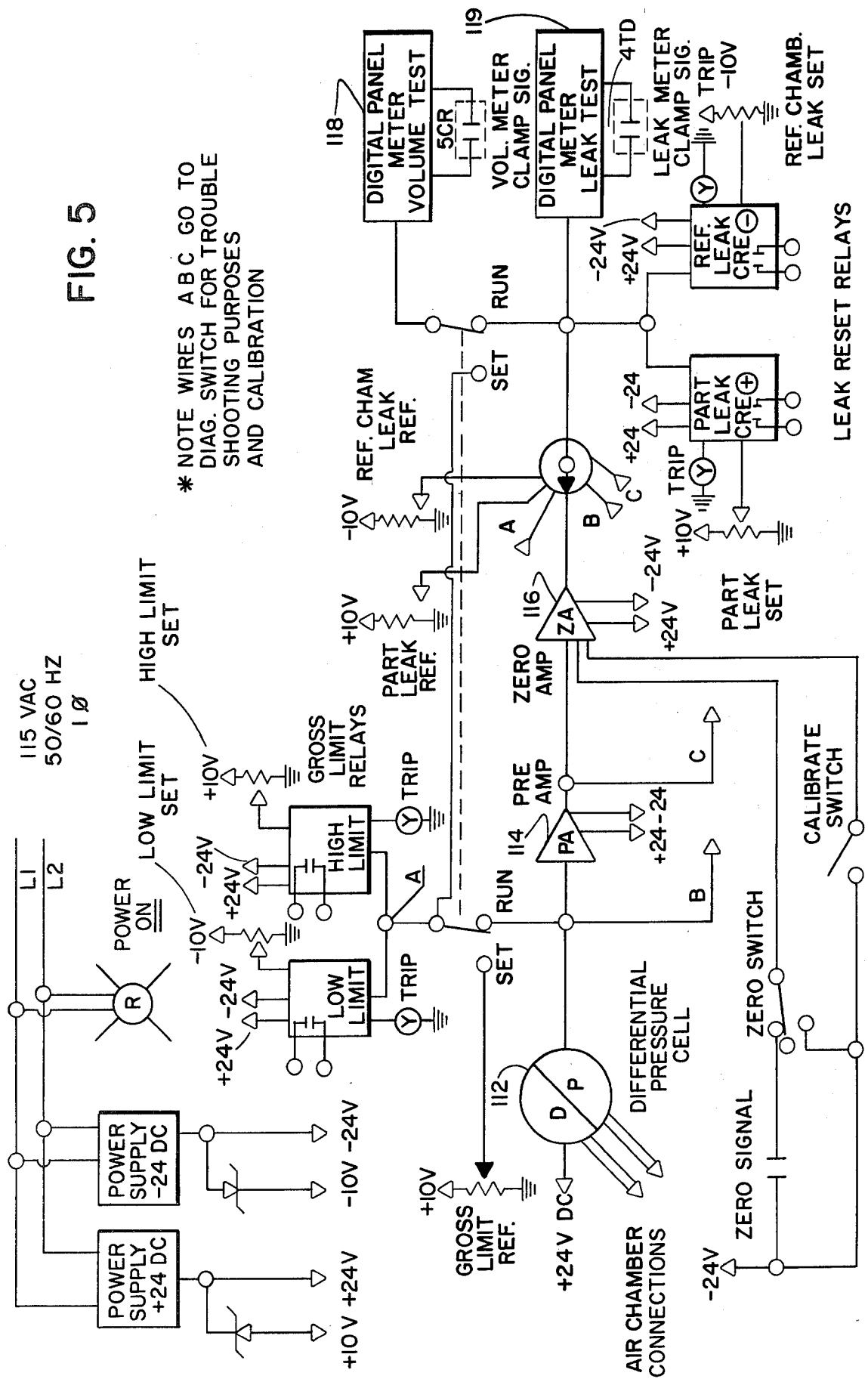

METHOD AND APPARATUS FOR MEASURING VOLUME

DESCRIPTION

1. Field of Invention

This invention relates to volume measurements by comparing gas pressures in a chamber of known volume with that in a chamber of unknown volume and reading the difference as a function of volume of the unknown chamber.

2. Background of the Invention

In the manufacture of internal combustion engine cylinder heads having combustion chambers therein it has long been necessary to measure the volume of the combustion chamber. Various approaches have been taken to this volume measurement, some of which are shown in the following United States Patent Nos:
2,270,505
2,341,138
2,635,466

Despite these prior efforts, the need remains for volume measurement which may be carried out quickly, as for example about ten seconds, with an accuracy of less than one cubic centimeter, such as 0.5 cc.

One of the difficulties in prior art efforts to measure the volume of a combustion chamber of a cylinder head in a production environment is that the measurement was accomplished using compressed air taken from the plant air supply and such compressed air varies in pressure, temperature and humidity content at various times during the production day. Another difficulty is that there is no verification of the volume measurement to determine whether there was air leakage during such measurement, and accordingly the test results could be faulty. Still another difficulty is that in one test currently being utilized, over 20 seconds are required to perform the test because of the necessity to allow for heat transfers and pressure stabilizations. For example, cylinder heads coming directly from a parts washer may be warmer than cylinder heads which have been allowed to cool before the volume measurement, and this temperature difference requires relatively long periods of temperature and pressure stabilization before performing the measurement function.

SUMMARY OF THE INVENTION

I have discovered a method of quickly and accurately measuring the volume of a test chamber, such as the combustion chamber of an internal combustion engine cylinder head, during the manufacture of the head by comparing such volume with a reference chamber of known volume. I accomplish the method by first sealingly closing both chambers and then injecting accurately related quantities of a gas into each chamber. I then compare the pressures in each chamber and read the difference as a function of the volume of the test chamber. Thereafter I read the rate of change of the pressure difference in the two chambers as a function of leakage and disregard the volume measurement if the rate of change exceeds a determined value. Thus, for the first time, as far as I know, there is provided verification for the volume measurement.

My method of volume measurement is accomplished in such a way that variations in temperature of the cylinder heads does not significantly affect the accuracy of the measurement and the long gas stabilization periods of prior art methods is not required. I accomplish this by forming the reference chamber in association with the cylinder head whose combustion chamber is to be measured whereby a surface portion of the cylinder head is exposed to the reference chamber and as a consequence the temperature of the gas injected into each chamber will reach temperature and pressure stabilization much more rapidly than in the prior art. In addition, I arrange it so that the ratio of the surface area of the cylinder head exposed to the reference chamber volume is substantially equal to the ratio of the surface area of the cylinder head defining the combustion chamber to the net volume of the combustion chamber during the test. This tends to equate heat transfer between the combustion chamber and reference chamber thus reducing temperature and pressure stabilization times for the gas in the two chambers.

Other features of my invention will become apparent from the following description and drawings.

BRIEF DESCRIPTION OF THE DRAWINGS

FIG. 5 is an electric schematic of the electronic circuitry of my measurement apparatus.

BRIEF DESCRIPTION OF PREFERRED EMBODIMENT

Figure 1:
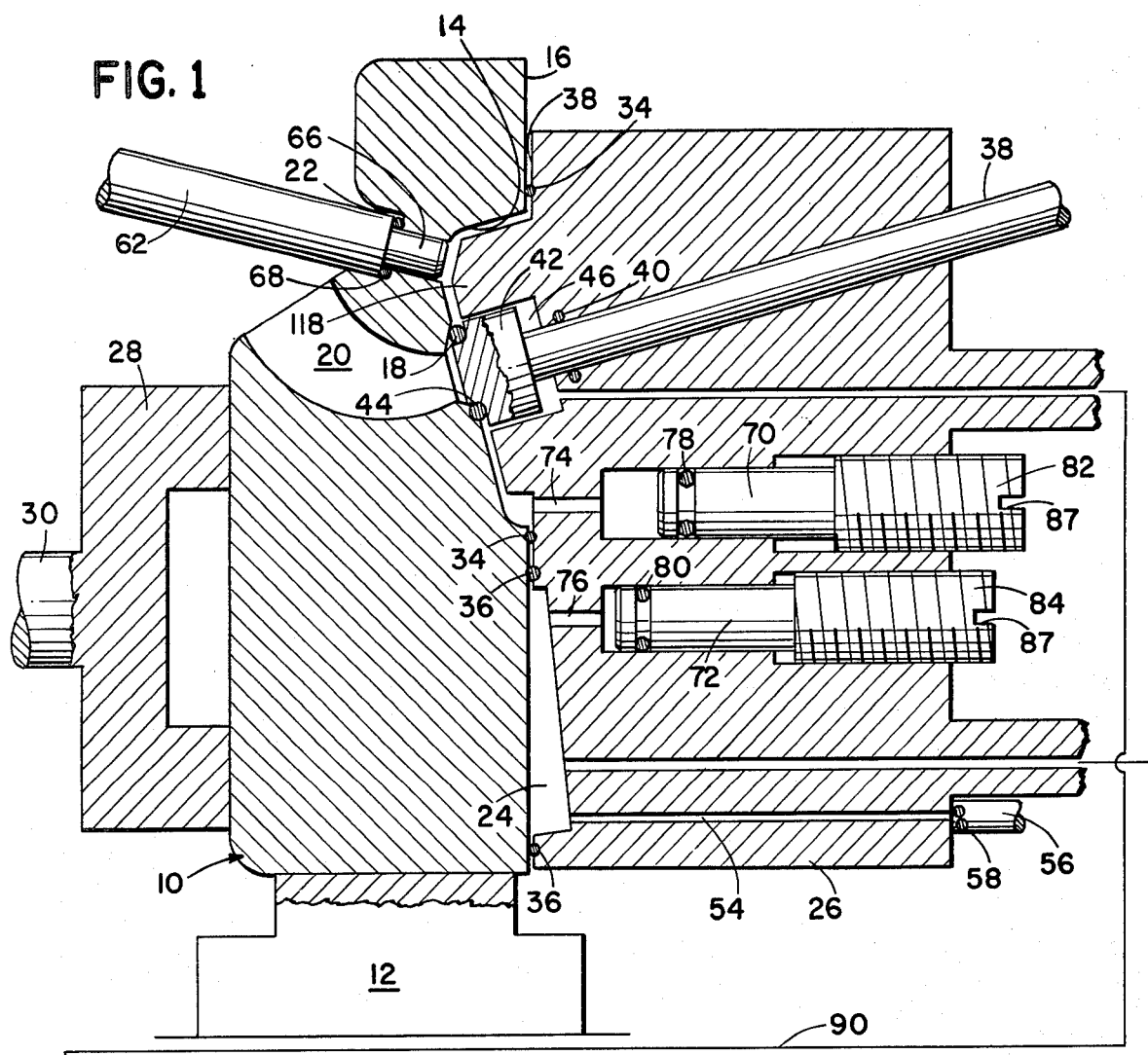
FIG. 1 is a schematic vertical section through apparatus for measuring the volume of a test chamber, such as the combustion chamber of an internal combustion engine cylinder head.
Figure 1:
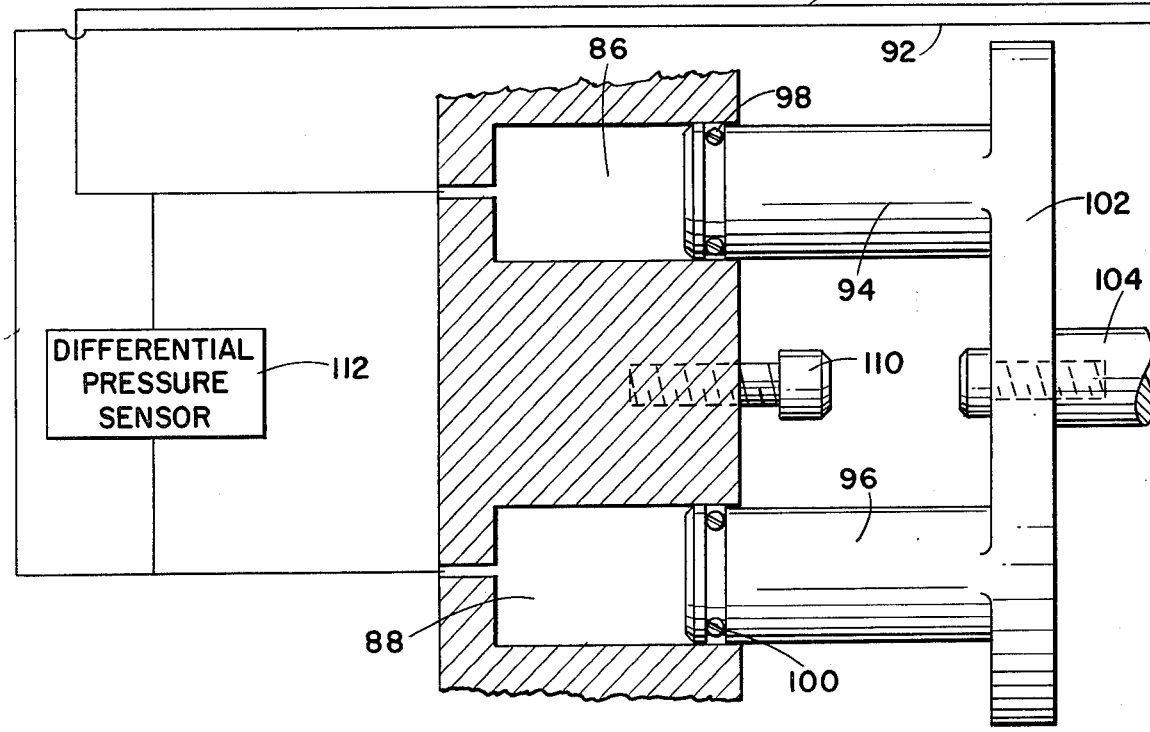

My invention is particularly well suited to use in a production environment wherein it is necessary to rapidly measure the volume of what I term a test chamber, such as the combustion chamber of an internal combustion engine cylinder head. One such head is schematically shown in FIG. 1 at 10. It is conveyed to the testing location where it is supported on a block 12. The cylinder head or part 10 contains a combustion chamber 14 hereinafter referred to as a test chamber, the volume of which is to be measured. The test chamber is open sided in that it opens through the face 16 of the cylinder head. The chamber volume must not vary by more than a given amount from a nominal or standard volume to be acceptable. The total chamber may be 70 or 80 cubic centimeters, though more or less than this will also be found in combustion chambers for internal combustion engines of various sizes and designs. Opposite the open side of the combustion or test chamber, there may be one or more ports, such as an exhaust valve port 18 which opens outwardly through a passageway 20 to the opposite side of the cylinder head. There may also be a spark plug or igniter port 22 opening from the combustion chamber 14 through the head to the opposite side. During testing these ports, as well as the open side of the test chamber, must be sealed, and such is accomplished as hereinafter explained.

If during the test it is determined tht the volume of the chamber 14 is greater than permissible, the cylinder head 10 may have the face 16 ground to reduce the volume of the chamber. On the other hand, should it appear that the volume of the chamber is less than required, the internal wall of the chamber may have some of the material removed to enlarge the volume. In a typical U.S. automobile engine today the volume of the combustion chamber must not be greater or lesser than a nominal or standard volume by more than 1.5 cc in either direction. Obviously, more or less variation may be permitted by some manufacturers than by others.

My method of measuring the volume of the test chamber utilizes a reference chamber of known volume. In this connection means are provided in the form of a test fixture 26 which defines the reference chamber 24. Means are provided for sealing the reference chamber 24 as well as the test chamber. Such means include several expedients. First, there are clamping means 28 which bears against the cylinder head 10 and urges it toward the test fixture 26. For this purpose the clamp may include a piston rod or the like 30 to be actuated by a fluid pressure cylinder 32 shown in FIG. 3. Clamp 28 serves to compress resilient seals 34 and 36 which respectively encircle the combustion chamber and reference chamber and are mounted in provided recesses in the face 38 of the test fixture 26. These seals may take various forms, and what I have shown is a schematic representation. In practice, these seals will compress sufficiently so that the faces 16 and 38 will meet in flush mating engagement rather than being separated the way they are shown, which showing is only for the purposes of clarity in the drawings.

The means for sealing the chambers also includes a valve seat seal comprising a plunger 38 received in a suitable bore in the fixture 26 and sealed by an O-ring seal or the like 40. On the inner end of the plunger there is an enlarged head 42 carrying an O-ring seal or the like 44 adapted to bear against the valve seat 18 to seal the same. The plunger head 42 moves within a cavity 46 in the test fixtures which is sufficiently larger than the plunger head so that there is free communication around the plunger as shown. At the other end of the plunger it is connected to a fluid pressure cylinder such as 48 shown in FIG. 3. There may be two such plungers and hydraulic cylinders, another being indicated in FIG. 3 at 48' to close a second valve port (not shown) in the cylinder head, such as an intake valve port. Upon pressurization of the cylinders 48 and 48', their respective plungers 38 and 38' are moved to dispose the sealing heads 42 in sealed relation with the valve seats. Flow control valves 50 and 52 are provided in the hydraulic lines to the cylinders 48 and 48' to slow the motion of the plungers 38 and 38' so that the closing action to seal the valve seats will not create unwanted pressures within the test chamber.

Figure 3:
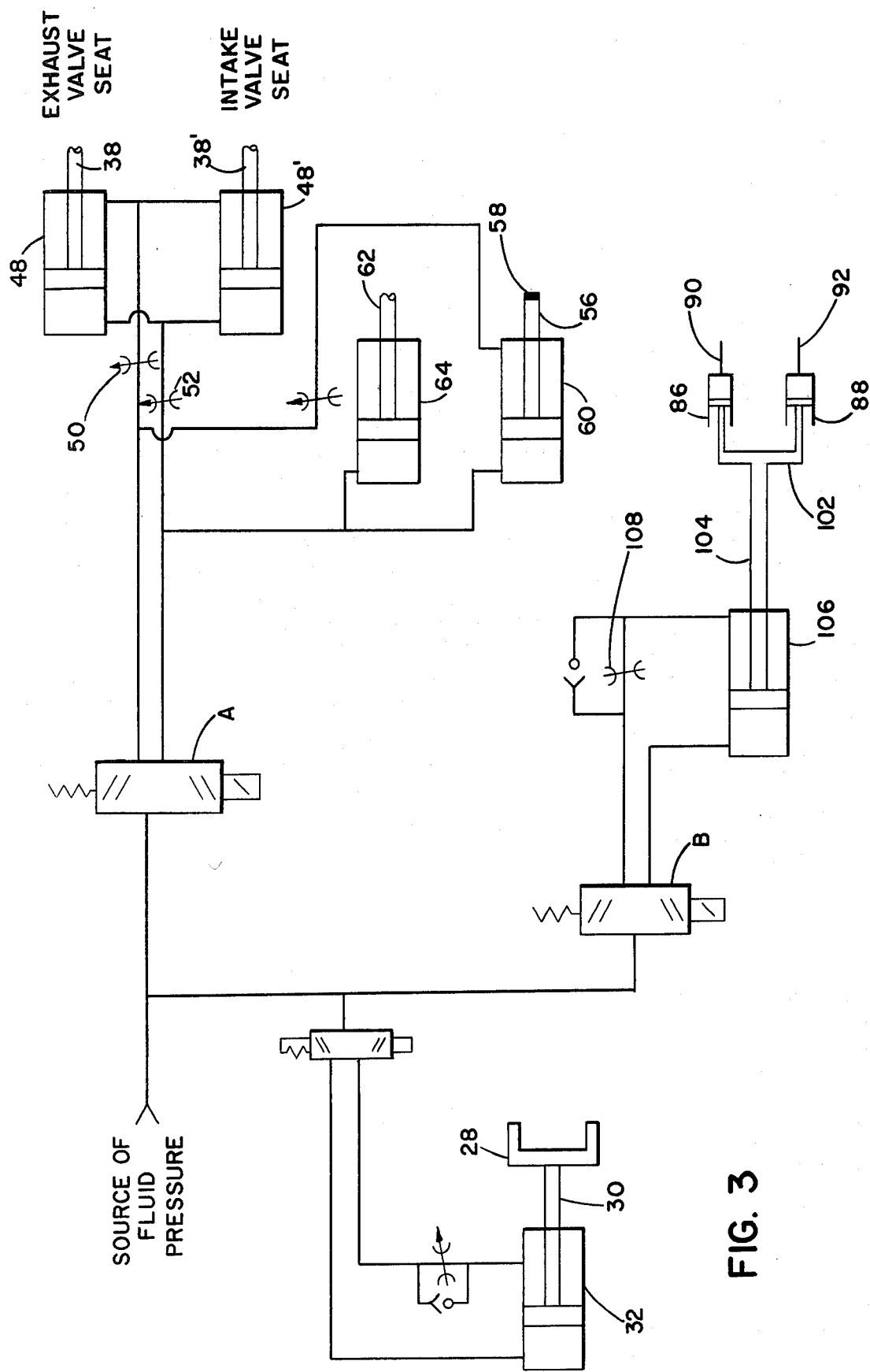
FIG. 3 is a schematic hydraulic diagram of various elements of the measurement apparatus.

The reference chamber 24 is provided with a vent passage 54 to be sealed by a plunger 56 having a sealing nose 58, the plunger being actuated by a hydraulic cylinder 60 shown in FIG. 3.

The spark plug or ignitor port 22 is sealed by a plunger 62 actuated by the hydraulic cylinder 64 shown in FIG. 3. The end of plunger 62 has a reduced diameter nose portion 66 which projects down into the port to reduce the volume of the test chamber. An O-ring seal or the like 68 mounted on the plunger is adapted to bear against the port seal to seal the same.

The respective volumes of the test and reference chambers may be varied or "fine-tuned" by the displacement pistons 70 and 72 received in complementary bores which communicate with their respective chambers by the passageways 74 and 76. Suitable O-ring seals 78 and 80 serve to prevent the escape of gas from the chambers outwardly of the pistons. Each of the pistons is formed with a screwthreaded portion 82 and 84 received in suitably threaded bore portions of the test fixture 26 as shown in FIG. 1 and screwdriver slots or the like 87 may be provided to facilitate rotation and thereby inward or outward adjustment of the pistons.

Means are provided for injecting accurately related quantities of a gas, such as air, into the reference chamber 24 and into the test chamber 14. Such means may comprise a pair of air cylinders 86 and 88 which communicate by respective passages 90 and 92 with the chambers. Each of the cylinders is provided with a piston as at 94 and 96 provided with seals 98 and 100. The pistons are jointly and equally actuated by a cross head 102 connected to the piston rod 104 of hydraulic cylinder 106 shown in FIG. 3. A flow control valve 108 limits the speed with which the injector pistons 94 and 96 may be forced into their respective cylinders 86 and 88 so that unwanted adiabatic temperature changes are avoided. A stop 110 will limit the movement of the injector pistons and thereby the pressure buildup in the test and reference chambers. Desirably, a gas pressure of not exceeding ten pounds per square inch is suitable for conducting the volume and leakage tests herein outlined.

Connected between the passageways or lines 90 and 92 is a differential pressure sensor schematically shown at 112. A suitable sensor for this purpose is manufactured by the Foxboro Company of Foxboro, Massachusetts, U.S.A., under Model No. 823. While a nanometer may be used, for high production applications the aforementioned Foxboro sensor is preferable. This sensor provides an output voltage which varies in value and from positive to negative in accordance with the pressure differential between the two chambers. The sensor is connected in a circuit which includes a power amplifier 114, a tare amplifier 116, a digital meter 118 which will read the output of the sensor as differential pressures in cubic centimeters, or, if desired, in a reference number. In one preferred arrangement the circuit will provide a one cubic centimeter increment for every 0.5 volt variation from the differential sensor 112. Thus a 1.5 volt working range will permit a variation of 3 cubic centimeters between the test and reference chambers. The meter is designed to display a four digit number in a LED display so volume increments in hundredths of a cubic centimeter may be read. The meter 118 may be manufactured by Weston Instruments Division of Sangamo Weston, Inc., Newark, N.J., as Model No. 2460.

The test fixture 26 includes a portion 118 which projects into the combustion chamber 114 to occupy volume therein and reduce the volume of the chamber to a net volume during the volume measurement and thereby reduce errors that might arise from dealing with larger gas volumes. The net volume of the test chamber 14 with the plunger head 42 engaging the valve seat 18 and with the plunger 62 extended to block the spark plug port must be related to the volume of the reference chamber 24 as hereinafter explained. I have found it is desirable not to have the net volume of the test chamber equal to the volume of reference chamber but rather to have these chambers differ by an amount at least as great as the maximum variation to be expected in the test chamber. Thus, if the maximum variation allowable for the volume of the test chamber is, for example, 3 cubic centimeters, the difference in volume between the reference chamber and the net volume of the test chamber should be slightly greater than this. The tuning of the reference and test chambers to effect this difference may be accomplished through the use of the fine-tuning pistons 70 and 72.

My measurement apparatus takes into consideration variation in the depth of the valve seat 18. It will be noted that if the valve seat is deeper, the volume of the test chamber will be greater. By utilizing a smaller diameter shank 38 than the plunger head 42, the diameter being such that its projected volume does not materially offset increased chamber volume as a result of the depth of the valve seat, the measurement will take into account variations in the valve seat depth.

It will be noted that the reference chamber is arranged to confront the cylinder head 10 and that a portion of surface 16 of the cylinder head in fact forms one side of the reference chamber 24 when the head 10 and fixture 26 are disposed in their juxtaposed sealed relation. Accordingly, the temperature of the cylinder head will be readily transmitted to the gas contained within the reference chamber 24. Thus, temperature and pressure stability as between the test and reference chambers may be more quickly and easily attained with this apparatus than in the prior art.

In addition, it is desirable that certain ratios of surface area to volume of the respective chambers be maintained. Specifically, it is desirable that the face 16 of the cylinder head which closes the open side of the reference chamber 24 have a relation or ratio to the volume of the reference chamber which is the same as, or close to, the ratio of the surface area of the cylinder head defining the test chamber 14 to the net volume of the test chamber during the test. Thus, substantially equal surface area to volume ratios of the chambers is maintained and accordingly substantially equal heat transfer effects are achieved between the cylinder head and the gases contained within each of the chambers. As a result, temperature and pressure stabilization may be achieved more rapidly than in the prior art. In determining volumes of the test and reference chambers during the volume measurements it is, of course, necessary to take into consideration the volumes of the various gas passageways which communicate with the chambers and compensation for differences in volumes of such passageways may be accomplished by the fine-tuning pistons 70 and 72.

In carrying out the volume measurement, I first cause pressurization of cylinder 32 to cause the clamp 28 to urge the cylinder head 10 into mating engagement against the test fixture 26. This serves to effect a seal between the cylinder head and the test fixture with the faces 16 and 38 brought into mating abutment. Thereafter cycle switch 120 is closed (either manually or automatically in response to the juxtaposition of the cylinder head and test fixture) and this energizes time delay relay TD1 which begins its timing cycle and solenoid A is also energized to pressurize cylinders 48 (and 48' if there is a second valve seat) to cause the plunger 38 to be extended and also to cause the plunger 62 to be extended. The flow control valve 50 (and 52 if there is a second valve seat) serves to slow the advance of the plunger 38 so that the head 42 is brought against the valve seat 18 without creating undue surges of air pressure within the combustion or test chamber and the possible resultant adiabatic temperature increase. The spark plug or ignitor port 22 is sealed by the plunger 62 after the port or ports 18 are sealed. This relieves any increase in pressure in the test chamber arising from the compression of seals 34 and 44 as the chamber is made airtight. This may be accomplished by adjustment of the flow control valve 64' controlling pressurization of cylinder 64 so that the plunger 62 moves more slowly than plunger 38. Similarly, the passageway 54 is closed by the nose seal 58 actuated by the cylinder 60 as the spark plug or ignitor port is sealed. The passageway 54, by being kept open to atmosphere during the sealing of the reference chamber against the surface 16 of the cylinder head, will serve to relieve any increased pressure arising from the sealing action. Thus, an increase in gas pressure within the reference chamber prior to the measurement is negligible.

It will be understood that during the timing interval of TD1, not only are the ports sealed as explained above, but also this timed interval provides for a temperature stabilization between the cylinder head and the air in the test and reference chambers. This first opportunity for temperature stabilization improves accuracy in test results and is a valuable step in the procedure.

Figure 4:
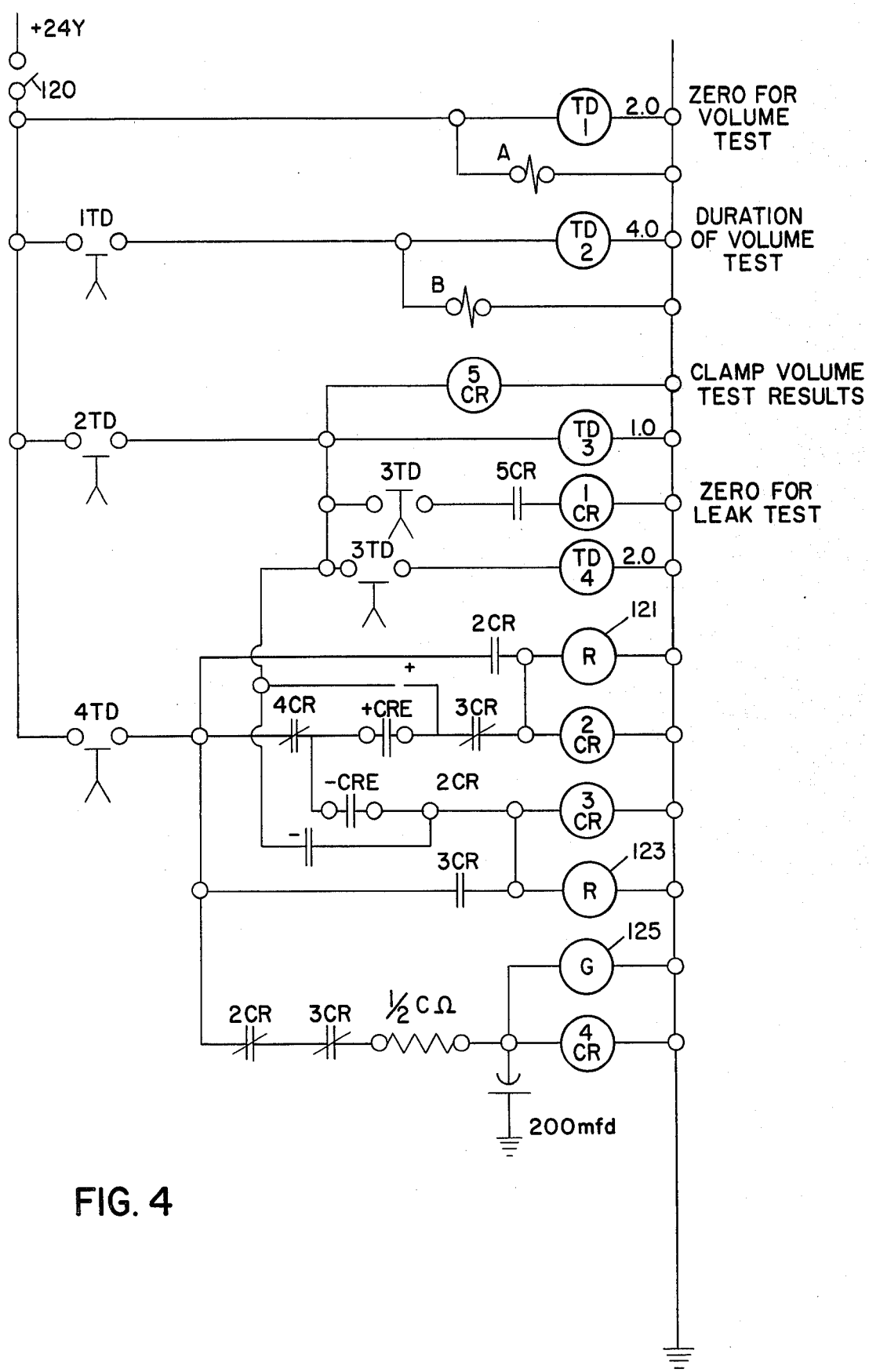
FIG. 4 is a schematic electrical diagram of the control circuit of my measurement apparatus.

When TD1 times out after a period of, for example, two seconds, it closes contact 1TD shown in FIG. 4 which in turn energizes TD2 and solenoid control valve B. Solenoid B controls pressurization of cylinder 106 which causes the pistons 94 and 96 to move into their respective cylinders to pressurize the test and reference chambers with accurately controlled amounts of air. While it is possible to design the system so that the respective amounts of air delivered by the cylinders 86 and 88 may differ, it is convenient if the amounts delivered are equal, and the system is so designed. The flow control valve 108 will reduce the speed of movement of pistons 94 and 96 so that undue surging or undesirable pressurization does not occur and the gas is delivered in a smooth or uniform manner reducing adiabatic temperature effects. In one embodiment the timer TD2 will require four seconds to time out, and during this time the air in the reference and test chambers are exposed to the walls of the cylinder head to effect heat transfer therebetween which will be substantially equal for the reasons above explained and result in a pressure stabilization in the two chambers.

When TD2 times out, it will serve to close relay switch 2TD to thereby energize timing relay TD3 and also relay 1CR and 5CR. Energization of relay 5CR will close contacts 5CR in FIG. 5 to display a reading on meter 118 of the pressure difference between the chambers as sensed by the differential sensor 112. The meter may be arranged to read in terms of cubic centimeters by adjustment of the amplifier 114. The closure of contacts 5CR serves to clamp the meter 118 so that the volume may be read by the operator or otherwise sensed, if desired, for a further processing step. For example, if the volume shown by the meter is greater than the acceptable variation, the cylinder head will be destined for reworking as before explained. When TD2 times out to energize relay 1CR, it also forces the tare amplifier 116 to zero, and energizes TD3 in preparation for the leak test.

When time relay TD3 times out, and it may desirably be set for a time period of one second, this drops out relay 1CR and initiates the leak, or volume verification, test and starts relay TD4. With the tare amplifier at zero, meter 119 will show a zero reading. When relay TD4 times out, it will cause a reading on meter 119 of the rate of change of differential pressures as between the reference and test chambers. If there is a leak in the test chamber, this will result in a positive reading on meter 119 through +CRE, while if there is a leak through the reference chamber, this will show on the meter as a negative reading through contact −CRE. These CRE units may be obtained from Automatic Timing and Controls, Inc., of King of Prussia, Pa., Model No. 650127009. If either 2CR or 3CR is energized as a result of detection of a leak from either chamber, relay 4CR will not be energized and the volume measurement will not be verified. Suitable lights or other indicators 121, 123 and 125 may be wired into the circuit to indicate verification or lack thereof, as shown in FIG. 4.

Thus, following the volumetric measurement a leak test is performed in which the gas pressures within the test and reference chambers are sensed and the rate of change of the pressure differential is observed. If the rate of change is within predetermined limits so that the volume measurement may be considered to not have been adversely affected by leakage from either chamber, the volumetric measurement is verified.

Following the foregoing testing, the cycle switch 120 is opened to thereby de-energize solenoids B and A and cause the pistons 94 and 96 to retract, drawing the air entrapped in the chambers back into the cylinders 86 and 88 for re-use in the next rest, thus preserving the energy level or temperature of the air used in the test as the same has been acquired from the cylinder head. Thus, completely new test air is not utilized with each test, but rather the already stabilized test air is re-used, thereby minimizing the variable introduced by utilization of compressed plant air in prior apparatus. Plungers 38 and 62 are also withdrawn to unseal the ports and clamp 28 is retracted so that the cylinder head may be removed from the supporting block 12 for further processing in the production system and to make way for a new head to be disposed on the support for test.

Figure 2:
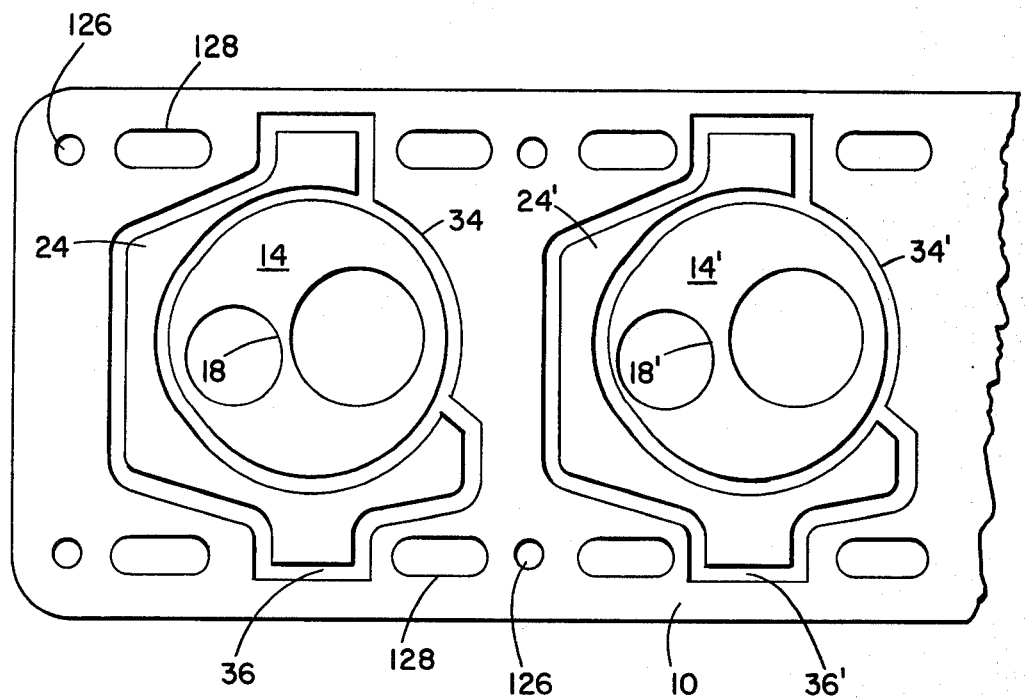
FIG. 2 is a fragmentary plan view of a cylinder head showing two combustion chambers and also showing the sealing means of my apparatus which will form a reference chamber in association with such cylinder head and substantially contiguous to, but isolated from the combustion chamber.

In FIG. 2 a cylinder head 10 is shown with a pair of combustion chambers 14 and 14′, each surrounded by a peripheral seal 34 and 34′. It is understood that these seals are carried by the test fixture 26, which is not shown for purposes of clarity. A pair of reference chambers 24 and 24′ are shown essentially contiguous to the combustion chambers 14 and 14′, being separated therefrom by that portion of the seals 34 and 34′ common to the two chambers. The reference chambers have an outer perimeter seal 36 and 36′. By arranging the reference and test chambers in the disclosed contiguous relation, the portions of the cylinder head exposed to the reference and test chambers during the measurement function will be contiguous and the reading obtainable from the measurement should be more accurate. It will be noted that the arrangement of the seals 36 and 36′ is such that they avoid apertures such as bolt holes 126 or coolant apertures 128 in the cylinder head.

I have found that with the method and apparatus above described, a typical automotive engine cylinder head combustion chamber may be measured in about eight seconds with an accuracy of 0.1 cc. This is nearly three times faster than in the prior art and with considerably greater accurace. Furthermore, because of the verification step, the accuracy of the volume measurement may be assured.

While I have referred throughout to the volume measurement of combustion chambers of cylinder heads, any of a variety of parts and chambers may be thus measured.

As used herein, the term "net volume of the test chamber" refers to the available volume of the combustion or test chamber when it is being measured, i.e., the chamber is clamped against the test fixture and all ports are sealed.

I claim:

1. The method of measuring the volume of a test chamber by comparing it with a reference chamber of known volume comprising the steps of:
   sealingly closing both chambers;
   while maintaining the temperatures of the two chambers substantially equal, injecting accurately related quantities of a gas into each chamber;
   comparing the pressures in each chamber and reading the difference as a function of the volume of the test chamber; and
   reading the rate of change of the pressure difference in the two chambers as a function of chamber leakage and disregarding the volume measurement if the rate exceeds a determined value.

2. The invention defined by claim 1 characterized by forming the reference chamber in association with the part containing the test chamber whereby a surface portion of such part is exposed to the reference chamber.

3. The method of measuring the volume of a test chamber by comparing it with a reference chamber of known volume comprising the steps of:
   exposing a reference chamber of known volume to a surface portion of the part containing the test chamber to permit heat transfer therebetween;
   sealing both the test chamber and the reference chamber against gas leakage;
   injecting accurately related quantities of a gas into each chamber; and
   comparing the pressures in each chamber and reading the difference as a function of the volume of the test chamber.

4. The invention defined by claim 2 or claim 3 wherein the ratio of said surface portion of said part to the volume of the reference chamber is substantially equal to the ratio of the surface area of said part defining the test chamber to the net volume of the test chamber.

5. The invention defined by claim 1, 2, or 3 wherein the gas is injected simultaneously into both chambers.

6. The invention defined by claim 1, 2, or 3 wherein equal quantities of gas are injected into the chambers.

7. The invention defined by claim 1 wherein the reading of said rate of change is performed after the reading of the pressure difference as a function of net volume of the test chamber.

8. The invention defined by claim 1 wherein successive test chambers are measured and following the testing of the reference and each test chamber the gas injected into each is withdrawn for re-use in the succeeding tests.

9. The method defined by claim 1 wherein the test chamber is provided with a port and the invention is characterized by the step of sealingly closing such port.

10. The invention defined by claim 9 wherein the step of sealing the port does not materially offset a volume change in the chamber resulting from variations in the depth of the port.

11. The invention defined by either claim 1, 2, or 3 wherein the volume of the reference chamber differs from the net volume of an acceptable test chamber by an amount not substantially greater than the acceptable variation in test chamber volume.

12. The invention defined by claims 2, or 3 wherein the reference chamber is formed at least in part contiguous to the test chamber.

13. The invention defined by claims 2 or 3 wherein the reference chamber at least in part surrounds the test chamber.

14. The method of measuring the volume of a chamber in a part which opens outwardly through a face of the part comprising:
sealing the chamber at the face through which it opens;
juxtaposing a reference chamber against said part and sealing it against said face, which reference chamber when so sealed being of a known volume,
after a time interval sufficient to at least partially stabilize gas temperatures in the chambers injecting into the test and reference chambers accurately related quantities of a gas under pressure;
after a time interval sufficient to substantially stabilize the injected gas pressures in the chambers, comparing the gas pressures in the chambers and reading the difference as a function of the volume of the test chamber; and
thereafter sensing the rate of change of said gas pressure difference in the chambers and reading it as a function of chamber leakage and disregarding the volume measurement if the rate of change exceeds a determined value.

15. The method of measuring the volume of a test chamber in each of a series of production parts moving along a conveyor line during processing of such parts, which chamber opens outwardly through a face of the part comprising the steps of:
sealing the chamber at the face of the port through which it opens;
juxtaposing a reference chamber against said port and sealing it against said face, which reference chamber when sealed being of a known volume;
sealing any other openings in the test and reference chambers;
after a time interval sufficient to at least partially stabilize gas temperatures in the chambers, injecting into the test and reference chambers accurately related quantities of a gas under pressure;
after a time interval sufficient to substantially stabilize the injected gas pressures in the chambers, comparing the gas pressures in the chambers and reading the difference as a function of the volume of the test chamber;
thereafter sensing the rate of change of said gas pressure difference in the chambers and reading it as a function of chamber leakage and disregarding the volume measurement if the rate of change exceeds a determined value;
withdrawing and storing the gas injected into the chambers for use in subsequent measurements; and
unsealing the chambers and disengaging the reference chamber from the part for further transfer of the part in the conveyor line.

16. Apparatus for measuring the volume of a test chamber in a part, comprising, in combination:
means defining a reference chamber of known volume;
means for sealing the reference chamber and the test chamber;
means for injecting accurately related quantities of a gas into the reference chamber and into the test chamber;
means for sensing the gas pressure differential between the chambers and reading the same as a function of volume of the test chamber; and
means for sensing the rate of change in gas pressure differential between the two chambers and reading as a function of chamber leakage to verify the previous volume measurement.

17. The invention defined by claim 16 wherein control means is provided connected to the aforesaid means for initiating operation thereof in a predetermined cycle of operation, said control means including a time delay function between initiation of the sealing means and the gas injection means to allow at least partial temperature stabilization of the test and reference chambers.

18. The invention defined by claim 17 wherein said control means includes a further time delay function between initiation of the gas injection means and the reading of the volume measurement to allow pressure stabilization of the gas in the test and reference chambers.

19. The invention defined by claim 16 wherein the means defining the reference chamber comprises a fixture having a portion configured and arranged to confront the part containing the test chamber to expose the reference chamber to such part in heat transfer relation therewith.

20. The invention defined in claim 19 wherein said fixture includes another portion configured and arranged to confront the part containing the test chamber and overlie the test chamber in heat transfer relation therewith.

21. The invention defined by claim 20 wherein the means for sealing the reference chamber and the test chamber includes clamping means for urging the fixture and the part containing the test chamber into mating abutting relation and also includes extensible and retractable port sealing means for cooperating with ports in the test chamber to sealingly close same.

22. In apparatus for measuring the volume of an open sided test chamber in a part having a port opening through a wall of the chamber opposite the open side, the combination comprising:
a fixture to overlie the open side of the test chamber in peripherally sealed relation therewith;
plunger means carried by the fixture and reciprocable within the chamber and having an end portion of a diameter to seal the port and a smaller diameter cylindrical shank portion carrying such end portion and extending sealingly through the fixture;
means for shifting and holding said plunger between positions sealed against the port or withdrawn therefrom; and
said shank being of such diameter in relation to the volume of the chamber being tested that variations in the projected volume of the shank resulting from variations in depth of the port do not unacceptably alter the volume measurement of the chamber.

23. Apparatus for measuring the volume of a test chamber in a part, comprising, in combination:
means defining a reference chamber of known volume for exposing the reference chamber directly to such part for heat transfer therebetween;
means for sealing the reference chamber and the test chamber;

means for injecting accurately related quantities of a gas into the reference chamber and into the test chamber; and means for sensing the gas pressure differential between the chambers and reading the same as a function of volume of the test chamber.

24. The invention defined by claim 23 wherein the surface area of the part exposed to the reference chamber is in a ratio to the volume of the reference chamber which is substantially equal to the ratio of the surface area of the part defining the test chamber to the net volume of the test chamber.

25. The invention defined by claim 2 or claim 3 wherein the ratio of said surface portion of said part to the volume of the reference chamber is substantially equal to the ratio of the surface area of said part defining the test chamber to the net volume of the test chamber, and wherein the gas is injected simultaneously into both chambers.

* * * * *

UNITED STATES PATENT AND TRADEMARK OFFICE
Certificate

Patent No. 4,430,891            Patented February 14, 1984

Albert E. Holm

Application having been made by Albert E. Holm, the inventor named in the patent above identified, for the issuance of a certificate under the provisions of Title 35, Section 256, of the United States Code, adding the name of Grant A. Holm as a joint inventor, and a showing and proof of facts satisfying the requirements of the said section having been submitted, it is this 26th day of Mar., 1985, certified that the name of the said Grant A. Holm is hereby added to the said patent as a joint inventor with the said Albert E. Holm.

Fred W. Sherling,
*Associate Solicitor.*